United States Patent
Cai et al.

(10) Patent No.: US 12,164,930 B2
(45) Date of Patent: Dec. 10, 2024

(54) SYSTEMS AND METHODS FOR NARROWING THE SCOPE OF A PROBLEM WHEN A MODEM IS BRICKED

(71) Applicant: ARRIS ENTERPRISES LLC, Suwanee, GA (US)

(72) Inventors: Linzhou Cai, Shenzhen (CN); Yongqiang Ye, Shenzhen (CN); Shenxia Tan, Shenzhen (CN); Yongqin Zuo, Shenzhen (CN); Dongting Zhang, Shenzhen (CN)

(73) Assignee: ARRIS Enterprises LLC, Horsham, PA (US)

( * ) Notice: Subject to any disclaimer, the term of this patent is extended or adjusted under 35 U.S.C. 154(b) by 86 days.

(21) Appl. No.: 17/795,637

(22) PCT Filed: Feb. 17, 2020

(86) PCT No.: PCT/CN2020/075491
§ 371 (c)(1),
(2) Date: Jul. 27, 2022

(87) PCT Pub. No.: WO2021/163829
PCT Pub. Date: Aug. 26, 2021

(65) Prior Publication Data
US 2023/0078692 A1    Mar. 16, 2023

(51) Int. Cl.
*G06F 9/4401*    (2018.01)
(52) U.S. Cl.
CPC .................................. *G06F 9/4411* (2013.01)

(58) Field of Classification Search
CPC ........ G06F 9/4411; G06F 8/65; G06F 9/4401; G06F 9/4406; G06F 11/2284;
(Continued)

(56) References Cited

U.S. PATENT DOCUMENTS

| | | | |
|---|---|---|---|
| 9,886,580 B2 | 2/2018 | Dasar et al. | |
| 10,262,309 B1 * | 4/2019 | Chan | G06F 9/441 |

(Continued)

FOREIGN PATENT DOCUMENTS

| | | |
|---|---|---|
| CN | 105068845 A | 11/2015 |
| EP | 1494119 A1 | 1/2005 |

OTHER PUBLICATIONS

Extended European Search Report, dated Oct. 4, 2023, issued in corresponding European Application No. 20919428.1-1203, 7 pgs.

(Continued)

*Primary Examiner* — Faisal M Zaman
(74) *Attorney, Agent, or Firm* — Panitch Schwarze Belisario & Nadel LLC (57) ABSTRACT

Embodiments of the systems and methods disclosed herein relate to a modem having a processor including a Unified Extensible Firmware Interface (UEFI) driver. The UEFI driver can be configured to provide a software interface between an operating system for the modem and firmware for the modem. The modem can include a boot diagnostic driver configured to run from the UEFI driver and execute a diagnostic test when the modem is booting up. The boot diagnostic driver can be configured to generate a signal based on a result of the diagnostic test.

20 Claims, 4 Drawing Sheets

(58) Field of Classification Search
CPC .. G06F 11/3041; G06F 11/326; G06F 11/328; G06F 21/575; G06F 11/3055
See application file for complete search history.

(56) References Cited

U.S. PATENT DOCUMENTS

| | | | | |
|---|---|---|---|---|
| 11,698,969 | B1* | 7/2023 | Henriquez Garcia | G06F 21/572 726/23 |
| 2006/0005046 | A1* | 1/2006 | Hars | G06F 21/572 714/E11.207 |
| 2006/0156140 | A1* | 7/2006 | Van Haegendoren | G06F 11/1417 714/741 |
| 2009/0292949 | A1* | 11/2009 | Quach | G06F 11/2284 714/E11.169 |
| 2010/0106956 | A1* | 4/2010 | Guo | G06F 9/4401 713/2 |
| 2012/0124567 | A1* | 5/2012 | Landry | G06F 8/654 717/168 |
| 2015/0113334 | A1* | 4/2015 | Raj | G06F 11/079 714/45 |
| 2015/0154033 | A1* | 6/2015 | Qu | G06F 9/4416 713/2 |
| 2016/0378970 | A1* | 12/2016 | Campbell | G06F 21/575 726/17 |
| 2017/0372074 | A1 | 12/2017 | Gunti et al. | |
| 2018/0365131 | A1* | 12/2018 | Armitage | G06F 11/3684 |
| 2019/0042391 | A1* | 2/2019 | Menon | G06F 11/3636 |
| 2019/0339958 | A1* | 11/2019 | Joshi | G06F 11/1417 |
| 2019/0384614 | A1* | 12/2019 | Kondapi | G06F 9/4408 |
| 2021/0073093 | A1* | 3/2021 | Huang | H04L 63/10 |
| 2021/0240561 | A1* | 8/2021 | Shah | G06F 11/0793 |
| 2021/0240567 | A1* | 8/2021 | Hsu | G06F 13/4282 |
| 2021/0382539 | A1* | 12/2021 | Suryanarayana | G06F 8/65 |
| 2022/0276876 | A1* | 9/2022 | Drury | G06F 1/329 |
| 2023/0027603 | A1* | 1/2023 | Liu | G06F 11/2273 |
| 2023/0087221 | A1* | 3/2023 | Feng | G06F 11/1433 713/2 |

OTHER PUBLICATIONS

Notification of Transmittal of the International Search Report (Forms PCT/ISA/220 and PCT/ISA/210) and the Written Opinion of the International Searching Authority (Form PCT/ISA/237) issued Nov. 20, 2020, by the National International Property Administration, PRC, in corresponding PCT/CN2020/075491. (9 pages).

* cited by examiner

SYSTEMS AND METHODS FOR NARROWING THE SCOPE OF A PROBLEM WHEN A MODEM IS BRICKED

TECHNICAL FIELD

Embodiments relate to systems and methods for determining where in the boot up stage a modem failure occurred.

BACKGROUND

A modem is a device that converts data into a format suitable for a certain transmission medium, facilitating data transmission to and from separate communication devices. Typically, a modem operates by modulating one or more carrier wave signals to encode digital information from a transmitting communication device for transmission of the encoded carrier wave signal through a transmission medium. A second modem associated with a receiving communication device demodulates the encoded carrier wave signal to decode the digital information for use by the receiving communication device. Typically, modems are used in communication systems in which a first communication device is configured to communicate with a second communication device, where each communication device generates and receives digital information but that digital information is more efficiently transmitted via an analog signal. Conversion of the digital information to and from the carrier wave is done so that the digital information can be transmitted efficiency through the transmission medium and decoded in a reliable manner, thereby facilitating reproduction of the original digital information.

In an exemplary communication architecture, the first communication device (e.g., a computer) will be connected to a first modem, the second communication device (e.g. a computer) will be connected to a second modem, and the first modem and second modem will be configured to transmit and receive signals to and from each other via a transmission medium (e.g., electrical wire, telephone line, co-axial cable, optical fiber, etc.). For instance, the first communication device can generate digital information and the first modem can modulate the digital information to encode it into a carrier wave. The first modem can transmit the carrier wave to the second modem, where the second modem demodulates the carrier wave to reproduce the digital information, which is then transmitted to the second communication device.

Modems can function as gateways (e.g., network nodes equipped to interface a communication device operating on a first communication protocol with a communication device operating on a second communication protocol). Because a modem can operate as a gateway, it may be beneficial to configure the modem to implement security features when operating. One of these security features can be a secure boot feature.

A modem can have a processor configured to run on software (e.g., an operating system). When a modem is turned off, the software is typically stored in non-volatile memory. When the modem is turned back on (i.e., booted), it does not have immediate access to that software, and so a boot loader executes a program to start a sequence that will pull data and programs from the non-volatile memory. After the boot sequence is completed, the processor of the modem then "kernels" into memory for execution of the operating system. This boot loader can operate in stages, wherein several programs of increasing complexity are loaded. When a modem having a processor configured to run a secure boot is booted, the processor validates the integrity of the boot loader and the firmware of the boot loader. One of the ways this is done is to compare the signature carried in the boot loader with the fingerprint stored in the processor. If a match is detected, the boot loader is then permitted to execute. If a mismatch is detected, the boot loader is not permitted to execute, and the modem does not boot up (or at least does not boot up successfully).

A common reason for a mismatch can be corrupted firmware. However, another scenario that can lead to a mismatch is when firmware is upgraded. A firmware upgrade is usually done by downloading and installing the new firmware into the modem, but this download process can go awry. In addition, even if the download is completed successfully, the updated firmware may not work as smoothly with some modems as with other modems. When a firmware upgrade causes the secure boot feature to prevent a modem boot, the modem becomes "bricked". When a modem is bricked, it stops its boot up at the particular boot loader stage the failure occurred and does not proceed any further, regardless of the number of times a user attempts to re-boot the modem. When a modem is bricked, it is difficult to determine whether the modem is actually bricked or if it has failed in some other fashion. Furthermore, during a secure boot operation, most, if not all, of the accessible interfaces are locked, which significantly limits the options a user can take to diagnose the problem and/or take corrective action. For instance, a user can acquisition little to no information about the modem's functionality when the interfaces are locked. Conventional methods for diagnosing a mode and taking corrective action are limited to: 1) noting the amount of time between the modem's failure and the update to determine if it is bricked; 2) unplugging the modem and starting it back up again; and 3) blindly removing and replacing components of the modem to determine if such a replacement corrected the problem. Such techniques are woefully inadequate, as they require large amounts of time, lack any type of structured approach, and fail to provide any real diagnostic assessment but rather rely on perturbing the system and hope that a positive result occurs.

SUMMARY

The systems and methods disclosed herein relate to determining where in the boot up stage a modem failure occurred.

In one embodiment, a modem has a processor including a Unified Extensible Firmware Interface (UEFI) driver. The UEFI driver can be configured to provide a software interface between an operating system for the modem and firmware for the modem. The modem can include a boot diagnostic driver configured to run from the UEFI driver and execute a diagnostic test when the modem is booting up. The boot diagnostic driver can be configured to generate a signal based on a result of the diagnostic test.

In some embodiments, the modem includes a light indicator. The boot diagnostic driver can be configured to transmit the signal to the processor. The processor can be configured to generate a light illumination sequence command that is representative of the signal, the light illumination sequence command being configured to cause the light indicator to illuminate.

In some embodiments, the boot diagnostic driver is configured such that the diagnostic test includes a plurality of diagnostic tests.

In some embodiments, the boot diagnostic driver is configured such that the plurality of diagnostic tests includes any or combination of: a first diagnostic test configured to determine whether a first secure boot loader successfully executed a first boot program; a second diagnostic test configured to determine whether a hardware check failure occurred; a third diagnostic test configured to determine whether an integrity validation failure occurred when the first secure boot loader attempted to execute the first boot program; a fourth diagnostic test configured to determine whether a second secure boot loader successfully executed a second boot program; a fifth diagnostic test configured to determine whether an integrity validation failure occurred when the second secure boot loader attempted to execute the second boot program; a sixth diagnostic test configured to determine whether an ATOM boot sequence was successfully booted; and a seventh diagnostic test configured to determine whether an ARM boot sequence was successfully booted.

In some embodiments, the boot diagnostic driver is configured such that the plurality of diagnostic tests includes all of the first, second, third, fourth, fifth, sixth, and seventh diagnostic tests.

In some embodiments, the boot diagnostic driver is configured such that the plurality of diagnostic tests is implemented in sequential order.

In some embodiments, the boot diagnostic driver is configured such that: when the first secure boot loader successfully executes the first boot program the boot diagnostic driver proceeds to the second diagnostic test, but when the first secure boot loader does not successfully execute the first boot program the boot diagnostic driver generates a first signal; when the hardware check failure does not occur the boot diagnostic driver proceeds to the third diagnostic test, but when the hardware check failure does occurred the boot diagnostic driver generates a second signal; when the integrity validation failure does not occur when the first secure boot loader attempted to execute the first boot program the boot diagnostic driver proceeds to the fourth diagnostic test, but when the integrity validation failure does occurred when the first secure boot loader attempted to execute the first boot program the boot diagnostic driver generates a third signal; when the second secure boot loader successfully executes the second boot program the boot diagnostic driver proceeds to the fifth diagnostic test, but when the second secure boot loader does not successfully execute the second boot program the boot diagnostic driver generates a fourth signal; when the integrity validation failure does not occur when the second secure boot loader attempted to execute the second boot program the boot diagnostic driver proceeds to the sixth diagnostic test, but when the integrity validation failure does occurred when the second secure boot loader attempted to execute the second boot program the boot diagnostic driver generates a fifth signal; when the ATOM boot sequence is successfully booted the boot diagnostic driver proceeds to the seventh diagnostic test, but when the ATOM boot sequence is not successfully booted the boot diagnostic driver generates a sixth signal; and when the ARM boot sequence is successfully booted the boot diagnostic driver concludes the diagnostic test sequence, but when the ARM boot sequence is not successfully booted the boot diagnostic driver generates a seventh signal.

In some embodiments, the processor is configured such that it generates: a first light illumination sequence command based on the first signal; a second light illumination sequence command based on the second signal; a third light illumination sequence command based on the third signal; a fourth light illumination sequence command based on the fourth signal; a fifth light illumination sequence command based on the fifth signal; a sixth light illumination sequence command based on the sixth signal; and a seventh light illumination sequence command based on the seventh signal.

In some embodiments, the processor is configured such that it generates the light illumination sequence command and causes the light indicator to illuminate even when the modem experiences a failure.

In some embodiments, the failure is at least due to an upgraded firmware that has been downloaded and/or attempted to be downloaded.

In one embodiment, a communication system can include a first communication device in connection with a first modem. The communication system can include a second communication device in connection with a second modem. The first modem can have a first processor including a first Unified Extensible Firmware Interface (UEFI) driver, the first UEFI driver configured to provide a software interface between an operating system for the first modem and firmware for the first modem. The first modem can have a first boot diagnostic driver configured to run from the first UEFI driver and execute a diagnostic test when the first modem is booting up. The first boot diagnostic driver can be configured to generate a signal based on a result of the diagnostic test.

In some embodiments, the second modem has a second processor including a second UEFI driver, the second UEFI driver configured to provide a software interface between an operating system for the second modem and firmware for the second modem. The second modem can have a second boot diagnostic driver configured to run from the second UEFI driver and execute a diagnostic test when the second modem is booting up. The second boot diagnostic driver can be configured to generate a signal based on a result of the diagnostic test.

In one embodiment, a method for diagnosing a modem failure can involve performing a diagnostic test of a software interface between an operating system for the modem and firmware for the modem while the modem is booting up. The method can further involve generating a signal based on a result of the diagnostic test.

In some embodiments, the method further involves generating a light illumination sequence command based on the signal.

In some embodiments, the diagnostic test includes a plurality of diagnostic tests.

In some embodiments, the plurality of diagnostic tests includes any or combination of: a first diagnostic test configured to determine whether a first secure boot loader successfully executed a first boot program; a second diagnostic test configured to determine whether a hardware check failure occurred; a third diagnostic test configured to determine whether an integrity validation failure occurred when the first secure boot loader attempted to execute the first boot program; a fourth diagnostic test configured to determine whether a second secure boot loader successfully executed a second boot program; a fifth diagnostic test configured to determine whether an integrity validation failure occurred when the second secure boot loader attempted to execute the second boot program; a sixth diagnostic test configured to determine whether an ATOM boot sequence was successfully booted; and a seventh diagnostic test configured to determine whether an ARM boot sequence was successfully booted.

In some embodiments, the plurality of diagnostic tests includes all of the first, second, third, fourth, fifth, sixth, and seventh diagnostic tests.

In some embodiments, the plurality of diagnostic tests is implemented in sequential order.

In some embodiments, the light illumination sequence command is generated even when the modem experiences a failure.

In some embodiments, the failure is at least due to an upgraded firmware that has been downloaded and/or attempted to be downloaded.

DETAILED DESCRIPTION

Figure 1:
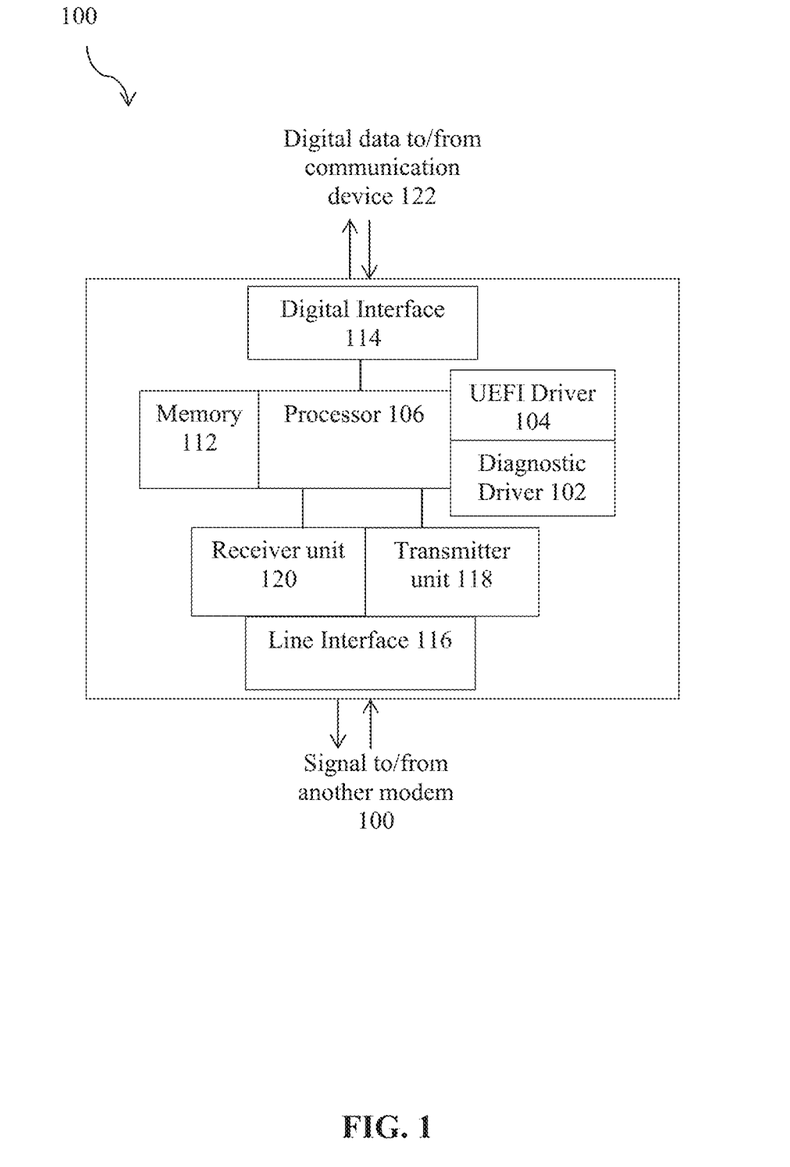
FIG. 1 is an exemplary block diagram showing component parts of an embodiment of the modem.
Figure 2:
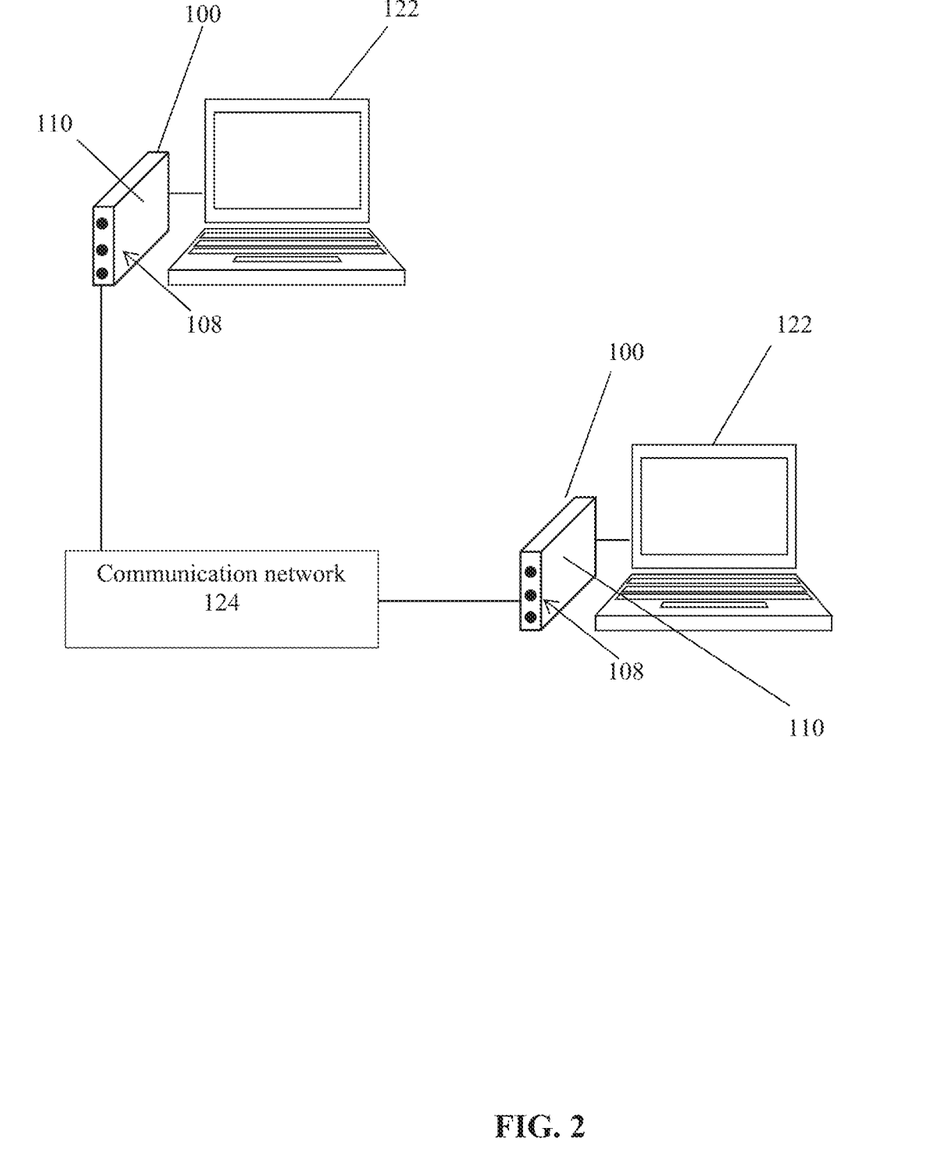
FIG. 2 is an exemplary communication system in which an embodiment of the modem can be used.

Referring to FIGS. 1-2, embodiments of the systems and methods disclosed herein are related to diagnosing a problem with a modem 100 when the modem 100 fails (e.g., is bricked or is experiencing some other type of operational failure). This can include determining what is causing the failure and/or determining which actions to take to correct or overcome the failure. The system includes a diagnostic driver 102 configured to run from a Unified Extensible Firmware Interface (UEFI) driver 104 of the modem 100 and perform diagnostic tests. The results of the tests can be used by the processor 106 of the modem 100 to cause the light indicators 108 (e.g., light emitting diode (LED)) of the modem 100 to illuminate in a predetermined manner. These predetermined illumination schemes can be used by a user to identify aspects or characteristics of the modem's 100 failure and assist a user with identifying the failure, narrowing the scope of possible failures, determining at which stage in the boot up process the modem 100 failed, etc.

A modem 100 can have a housing 110 configured to contain operating modules for the modem 100. These operating modules can include a processor 106 in operative association with a memory 112, a digital interface 114, a line interface 116, a transmitter unit 118, and a receiver unit 120. The processor 106 can be configured to execute software (e.g., operating system software) and firmware stored on the memory 112. The processor can be a central processing unit (CPU), for example. The memory 112 can include volatile memories and non-volatile memories. The non-volatile memories can include a Not Or (NOR) flash memory, a Not And (NAND) flash memory, and a Non-Volatile Random Access Memory (NVRAM) memory. The digital interface 114 can include integrated circuitry configured to receive and transmit digital data to and from a communication device 122. The processor 106 can receive the digital data from the digital interface 114 and encode the data. The transmitter unit 118 can include integrated circuitry configured to generate a carrier signal, receive the encoded data from the processor 106, and modulate the carrier signal with the encoded data. The transmitter unit 118 can transmit the modulated carrier signal to the line interface 116. The line interface 116 can include integrated circuitry configured to transmit the modulated carrier signal to a transmission medium (e.g., electrical wire, telephone line, co-axial cable, optical fiber, etc.).

The modulated carrier signal may travel though at least one communication network 124 to another modem 100. For instance, a first communication device 122 can be connected to a first modem 100. A second communication device 122 can be connected to a second modem 100. The first modem 100 and the second modem 100 can be configured to transmit and receive signals to and from each other via at least one communication network 124. In an exemplary implementation, the first modem 100 can be the transmitting modem 100 and operate to generate the modulated carrier signal described above. The second modem 100 can be the receiving modem 100 configured to receive the modulated carrier signal. The receiving modem 100 can receive the modulated carrier signal via its line interface 116. The receiver unit 120 (having integrated circuitry configured to demodulate the carrier signal) of the receiving modem 100 can demodulate the carrier signal and extract the encoded digital data. The encoded digital data can be transmitted to the receiving modem's processor 106 where the original digital data is reproduced. The original digital data is then transmitted to the receiving modem's digital interface 114, where the original digital data is transmitted to the second communication device 122.

The digital interface 114 and/or the line interface 116 can also include ports, couplings, and/or connectors (any of which may include data communication equipment (DCE) or data terminal equipment (DTE)) to facilitate electrical and/or optical connection to a communication device 122 via telephone lines, Transmission System-1 (T1) lines, Integrated Services Digital Network (ISDN) lines, etc.

In some embodiments, the processor 106 can include a Unified Extensible Firmware Interface (UEFI) driver 104. The UEFI driver 104 can be a software module or engine configured to define a software interface between the modem's 100 operating system and its firmware. For instance, embodiments of the UEFI driver 104 can be programmed to require the modem's 100 firmware and the modem's 100 operating system secure boot loader to be size-matched (e.g., the UEFI driver 104 can require that a 64-bit UEFI firmware implementation only load a 64-bit operating system secure boot loader).

In some embodiments, the modem 100 includes light indicators 108 that indicate whether certain functions of the modem 100 are being performed and/or provide an activity status of the modem 100. For instance, a surface of the housing 110 can include a plurality of light indicators 108 having LEDs that emit light based on the activity status of the modem 100. The processor 106 can be configured to perform analytics on any of the operating modules and/or receive signals from switches, sensors, etc. that are indicative of activity levels of the operating modules. Each light indicator 108 can be connected to the processor 106 and illuminate based on the activity level(s). The processor 106 can cause the light indicators 108 to illuminate as a function of the activity status. For instance, any one or combination of the light indicators 108 can illuminate, not illuminate, illuminate at a certain color (e.g., red, green, yellow, etc.), illuminate at a constant and continuous emission, illuminate in pulses with a pulse frequency, illuminate in pulses at a pulse duration, illuminate at a certain brightness, illuminate with a changing color, etc. based on the activity level of the modem 100.

These light indicators 108 can include a power indicator light 108 (indicating whether electrical power is being supplied to the modem), an upstream/downstream (US/DS) indicator light 108 (indicating whether an US/DS connection has been made), an online indicator light 108 (indicating that a connection to a webserver has been made), a Telephone line-1 (Tel1) indicator light 108 (indicating the communication status of telephone line 1), a Telephone line-2 (Tel2) indicator light 108 (indicating the communication status of telephone line 2), a Battery indicator light 108 (indicating whether electrical power is being supplied from the battery of the modem 100, a Wireless Fidelity (WiFi) 2.4G indicator light 108 (indicating whether a WiFi connection over a 2.4 G network has been established), a WiFi 5G indicator light (indicating whether a WiFi connection over a 2.4 G network has been established), etc. Other indicator lights 108 can include a digital subscriber line (DSL) indicator (indicating whether an effective DSL connection has been made), a Personal Computer (PC) card port indicator (indicating whether a PC card is plugging into the PC card port), a Home Phoneline Networking Alliance (HPNA) port indicator light (indicating whether a HPNA link has been made), etc.

The modem 100 architectures and operations described above are exemplary only. It is understood that other modem 100 architectures and operational constraints can be used. It is further understood that any of the modems 100 can include other circuitry and operating modules, such as data compressors, buffers, scramblers, clocks, filters, analog to digital converters, signal processors, etc. to improve or tailor the functionality of the modem 100 and/or facilitate meeting a desired design objective for the modem 100.

As noted herein, a secure boot loader can operate in stages. For instance, modem 100 can have a first secure boot loader (FSBL) configured to execute a first boot program and a second secure boot loader (SSBL) configured to execute a second boot program. The FSBL can be configured to operate from the NOR flash memory. The SSBL can be configured to operate from the NAND flash memory. While exemplary embodiments may describe the systems and methods being configured such that FSBL operates from the NOR flash memory and the SSBL operates from the NAND flash memory, other operating schemes can be used. For instance, each of the FSBL and the SSBL can operate from the NOR flash memory, each of the FSBL and the SSBL can operate from the NAND flash memory, etc. It should be noted that more secure boot loaders and boot programs may be used, and that a discussion of two secure boot loaders with two boot program stages is not intended to limit embodiments of the systems and methods disclosed herein to modems operating with only two boot loaders.

When a modem 100 fails due to a firmware upgrade and becomes bricked, the failure can occur due to a corruption to the NOR flash memory, a corruption to the NAND flash memory, and/or a corruption to the NVRAM memory. A "corruption" to the memory 112 can occur due to a corrupted firmware, an improper firmware download, and/or an upgraded firmware that does not work as intended with the modem 100. A corruption to the memory 112 typically results in an alteration to the memory 112 without an explicit assignment, leading to a modification of the locations where contents are stored and/or to programmatic behavior that exceeds the intended limits of the programmatic behavior. Typically, a modem failure due to a bricked modem 100 occurs before the kernel stage—i.e., the modem 100 becomes bricked during the boot up stage(s) and before the processor 106 kernels into memory 112 for execution of the modem's 100 operating system. During the boot up stage(s), the light indictors 108 (with the exception of the power indicator light 108) are offline—meaning that they are not illuminating and are not being used by the processor 106 as indicators of the activity level of the modem 100. Thus, the light indicators 108 are free to be used to monitor the functions of the modem 100 during the boot up stage(s).

This can be achieved by configuring the modem 100 to have a boot diagnostic driver 102 configured to run from the UEFI driver 104, wherein the boot diagnostic driver 102 performs diagnostic tests, the results of which are presented via illumination sequences/schemes of the light indicators 108. The illumination sequences/schemes can include combinations and/or permutations of light indicators 108 being on or off, the color the light indicators 108 are being illuminated, whether the light indicators 108 are illuminating at a constant emission or with a pulsation, with which the frequency light indicators 108 are pulsing, with which duration the light indicators are pulsing, etc. A user can then monitor the light indicators 108 during the boot up or when the modem 100 fails to assist with diagnosing the failure.

For instance, monitoring the light indicators 108 can assist a user in determining whether the corruption occurred in the NOR flash memory, the NAND flash memory, and/or the NVRAM memory, determining which boot up stage the modem 100 was in when it became bricked, determining whether the modem 100 became bricked when the FSBL was executing the first boot program or when the a SSBL was executing the second boot program, etc.

In an exemplary embodiment, the modem 100 is configured to have at least the following light indicators 108: a downstream (DS) light indicator 108, am upstream (US) light indicator 108, and an Ethernet light indicator light 108. The modem 100 can have a boot diagnostic driver 102 configured to run from the UEFI driver 104. The boot diagnostic driver 102 performs a boot diagnostic test of the functions performed by the UEFI driver 104 and activity levels of the modem 100. The results of the boot diagnostic test can be transmitted from the boot diagnostic driver 102 to the processor 106. Depending on the results of the boot diagnostic test, the processor 106 causes the light indicators 108 to illuminate via a predetermined illumination scheme. For instance, the boot diagnostic driver 102 can be configured to execute any one or combination of a "Load FSBL Success" diagnostic test, a "Hardware (HW) Check Pass" diagnostic test, a "FSBL Verified Pass" diagnostic test, a "Load SSBL Success" diagnostic test, a "SSBL Verified Pass" diagnostic test, an x86 instruction set architecture, such as Intel® Atom microprocessor for example (ATOM) boot or "ATOM Boot" diagnostic test, an Advanced Reduced instruction set computing architecture Machine (ARM) boot or "ARM Boot" diagnostic test, etc.

It is contemplated for these diagnostic tests to be operated in sequential order; however, the diagnostic tests can be implemented by any other order or sequence. For instance, the boot diagnostic driver 102 can be configured to execute the "Load FSBL Success" diagnostic test, the "Hardware (HW) Check Pass" diagnostic test after the Load FSBL Success" diagnostic test, the "FSBL Verified Pass" diagnostic test after the "Hardware (HW) Check Pass" diagnostic test, the "Load SSBL Success" diagnostic test after the "FSBL Verified Pass" diagnostic test, the "SSBL Verified Pass" diagnostic test after the "Load SSBL Success" diagnostic test, the "ATOM Boot" diagnostic test after the "SSBL Verified Pass" diagnostic test, and "ARM Boot" diagnostic test after the "ATOM Boot" diagnostic test. In some embodiments, these diagnostic tests can be implemented only after the previous test has been determined to be successful. In some embodiments, the subsequent test can be implemented regardless of whether it has been determined that the previous test had been successful. These diagnostic tests can be implemented during boot up of the modem 100, after the modem 100 has booted up, after the modem 100 becomes bricked, etc.

Figure 3:
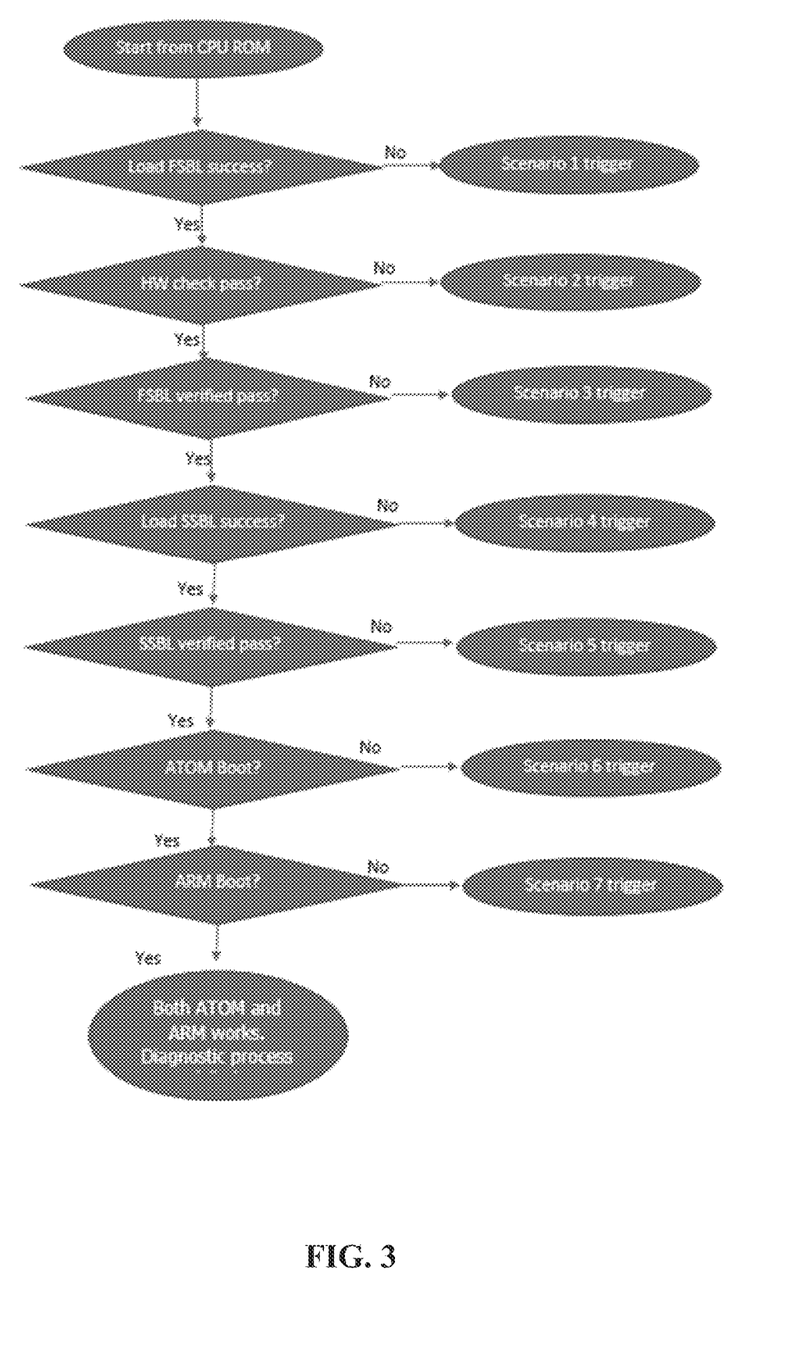
FIG. 3 is an exemplary decision flow diagram that can be used for an embodiment of the modem.

Referring to FIG. 3, in the "Load FSBL Success" diagnostic test, the boot diagnostic driver 102 determines if the FSBL successfully loaded or executed the first boot program. If not, this can be an indicator of corruption in the NOR Flash memory, as the FSBL is configured to operate from the NOR flash memory. If the boot diagnostic driver 102 determines that the FSBL did successfully load or execute the first boot program then it can proceed to the "Hardware (HW) Check Pass" diagnostic test. If the boot diagnostic driver 102 determines that the FSBL did not successfully load or execute the first boot program then a Scenario 1 signal is transmitted from the diagnostic driver 102 to the processor 106.

In the "Hardware (HW) Check Pass" diagnostic test, the boot diagnostic driver 102 determines if there is a hardware check fail after the FSBL successfully loaded or executed the first boot program. This can be an indicator of inoperable hardware (e.g., an Ethernet switch initiation failure). If the boot diagnostic driver 102 determines that there is not a hardware check fail after the FSBL successfully loaded or executed the first boot program then it can proceed to the "FSBL Verified Pass" diagnostic test diagnostic test. If the boot diagnostic driver 102 determines that there is a hardware check fail after the FSBL successfully loaded or executed the first boot program then a Scenario 2 signal is transmitted from the diagnostic driver 102 to the processor 106.

In the "FSBL Verified Pass" diagnostic test, the boot diagnostic driver 102 determines whether there was an integrity validation failure when the FSBL attempted to load or execute the first boot program. This can be an indicator of a corruption to the signature, for example. If the boot diagnostic driver 102 determines that there was not an integrity validation failure when the FSBL attempted to load or execute the first boot program then it can proceed to the "Load SSBL Success" diagnostic test. If the boot diagnostic driver 102 determines that there was an integrity validation failure when the FSBL attempted to load or execute the first boot program then a Scenario 3 signal is transmitted from the diagnostic driver 102 to the processor 106.

In the "Load SSBL Success" diagnostic test, the boot diagnostic driver 102 determines if the SSBL successfully loaded or executed the second boot program. If not, this can be an indicator of corruption in the NAND Flash memory, as the SSBL is configured to operate from the NAND flash memory. If the boot diagnostic driver 102 determines that the SSBL successfully loaded or executed the second boot program then it can proceed to the "SSBL Verified Pass" diagnostic test. If the boot diagnostic driver 102 determines that the SSBL did not successfully load or execute the second boot program then a Scenario 4 signal is transmitted from the diagnostic driver 102 to the processor 106.

In the "SSBL Verified Pass" diagnostic test, the boot diagnostic driver 102 determines whether there was an integrity validation failure when the SSBL attempted to load or execute the second boot program. This can be an indicator of a corruption to the signature, for example. If the boot diagnostic driver 102 determines that there was not an integrity validation failure when the SSBL attempted to load or execute the second boot program then it can proceed to the "ATOM Boot" diagnostic test. If the boot diagnostic driver 102 determines that there was an integrity validation failure when the SSBL attempted to load or execute the second boot program then a Scenario 5 signal is transmitted from the diagnostic driver 102 to the processor 106.

In the "ATOM Boot" diagnostic test, the boot diagnostic driver 102 determines if an ATOM boot sequence successfully booted. If the boot diagnostic driver 102 determines that the ATOM boot sequence was successfully booted then it can proceed to the "ARM Boot" diagnostic test. If the boot diagnostic driver 102 determines that the ATOM boot sequence was not successfully booted then a Scenario 6 signal is transmitted from the diagnostic driver 102 to the processor 106.

In the "ARM Boot" diagnostic test, the boot diagnostic driver 102 determines if an ARM boot sequence successfully booted. If the boot diagnostic driver 102 determines that the ATOM boot sequence was successfully booted then the diagnostic testing can be completed. If the boot diagnostic driver 102 determines that the ATOM boot sequence was not successfully booted then a Scenario 7 signal is transmitted from the diagnostic driver 102 to the processor 106.

An exemplary way in which the boot diagnostic driver 102 can make the determination for the tests can be via a log. For instance, the FSBL can be configured to generate a "FSBL manifest verified OK" log, the SSBL can be configured to generate a "SSBL manifest verified OK" log, etc. The boot diagnostic driver 102 can compare the FSBL manifest verified OK and SSBL manifest verified OK logs with the log(s) generated from the standard output to determine if the specific FSBL and SSBL logs are captured in the standard logs. This will allow the boot diagnostic driver 102 to determine at which stage the boot up is currently in. For instance, if there is a failure to authenticate, the FSBL and/or SSBL log generate any of the following: FAIL-Manifest error, FAIL-Manifest signature error, FAIL-Blocked by SVN, and FAIL-Image hash mismatch. The boot diagnostic driver 102 can then compare these to the standard log(s) to determine if these are captured in the standard log(s).

As another example, the boot diagnostic driver 102 can be configured to start up at a very early stage in the boot up and monitor signals from the processor 106. The processor 106 signals can be representative of: the FSBL successfully loading or executing the first boot program; a successful hardware check indication; an integrity validation confirmation when the FSBL attempted to load or execute the first boot program; the SSBL successfully loading or executing the second boot program; an integrity validation confirmation when the SSBL attempted to load or execute the second boot program; the ATOM boot sequence successfully booting; and the ARM boot sequence successfully booting. If the boot diagnostic driver 102 receives a signal pertaining to that stage, then the boot diagnostic driver 102 can determine that the stage was successful. However, if the boot diagnostic driver 102 does not receive such a signal after monitoring for that signal for a predetermined period of time (e.g., 3 seconds), then the boot diagnostic driver 102 can determine that the boot up failed at that stage.

In some embodiments, the boot diagnostic driver 102 transmits a Scenario 8 signal to the processor 106 if all diagnostic tests have been conducted and no unsuccessful boot up processes have been detected.

The diagnostic test sequence can be initiated upon booting up of the modem 100. For instance, during boot up the UEFI driver 104 begins is execution, which can cause the diagnostic driver 102 to automatically begin its execution. The diagnostic driver 102 can begin to perform its diagnostic tests as the modem 100 is booting up. As the modem 100 boots up and cycles through the secure boot loading stages, the diagnostic driver 102 can perform its tests. If/when the modem 100 fails and/or becomes bricked at a certain stage, the test being conducted by the diagnostic driver 102 will be commensurate with that operational stage. For instance, if upon boot up the modem 100 becomes bricked during the loading of the second boot program by the SSBL, then the diagnostic driver 102 will have already determined that the "Load FSBL Success" diagnostic test, the "Hardware (HW) Check Pass" diagnostic test, and the "FSBL Verified Pass" diagnostic test were successful. The diagnostic driver 102 will then determine that the second boot program failed to load or execute, thereby transmitting a Scenario 4 signal to the processor 106. If the problem associated with the loading of the second boot program by the SSBL is corrected for, the diagnostic driver 102 can detect that the second boot program has been successfully loaded and then proceed to the "SSBL Verified Pass" diagnostic test. Alternatively, after the problem associated with the loading of the second boot program by the SSBL is corrected for, the modem 100 can be caused to re-boot, whereby the booing process and the diagnostic test sequence starts over.

If, on the other hand, the modem 100 does not fail or does not become bricked during boot up, the diagnostic driver 102 will complete all of the tests and determine that all have been successful, thereby not transmitting any Scenario signals. Alternatively, if diagnostic driver 102 determines that all have been successful, it can transmit a Scenario 8 signal.

The processor 106 can cause the light indicators 108 to illuminate based on the Scenario signal received. Table 1 depicts an exemplary light indicator 108 illumination sequence/scheme that can be used.

Scenario 1, they can determine that the modem 100 failed during the first stage, that the FSBL failed to load the first boot program, and that it may be due to a NOR flash memory corruption. If a user views the light indicator panel and identifies a light indicator 108 illumination sequence of Scenario 4, they can determine that the modem 100 failed during the second stage, that the SSBL failed to load the second boot program, and that it may be due to a NAND Flash memory corruption.

Upon receiving an illumination sequence, a user can refer to the log comparison and/or the processor 106 signals received by the boot diagnostic driver 102 to make further assessments about the illumination sequences, which can assist with narrowing the scope of the potential problems that resulted in modem failure.

As noted above, the use of three light indicators 108 is exemplary. As another example, the system and method can use only one light indicator 108. In this example, the color of light being emitted and the number of pulses per time period can be used as opposed to whether the light indicators 108 are on or off. Table 2 depicts an exemplary light indicator 108 illumination sequence/scheme that can be used if only one light indicator 108 is used. The colors used can be red and blue, for example. The pulsation can be a pulse-on duration of 100 ms and then a pulse-off period of 2-seconds, for example. For instance, in Table 2, the column with 4 pulses indicates that the light indicator 108 emits four

TABLE 1

Exemplary 3-Light Indicator Illumination Sequence/Scheme

| Scenario Signal | DS Light Indicator | US Light Indicator | Ethernet Light Indicator | Diagnostic Meaning |
|---|---|---|---|---|
| Scenario 1 | Off | Off | Off | FSBL failed to load. May be due to NOR corruption. |
| Scenario 2 | Off | Off | On | FSBL is loaded but a hardware check failure occurred. May be an Ethernet switch initiate issue. |
| Scenario 3 | Off | On | Off | FSBL failed due to secure boot validation failure. May be due to signature mismatch or the manifest data can be corrupted. |
| Scenario 4 | Off | On | On | SSBL failed to load. May be due to NAND corruption. |
| Scenario 5 | On | Off | Off | SSBL failed to boot from both banks. May be due to both banks being marked as invalid. |
| Scenario 6 | On | Off | On | ATOM fail to boot. |
| Scenario 7 | On | On | Off | ARM fail to boot. |
| Scenario 8 | On | On | On | Both ATOM and ARM works. Diagnostic process killed and everything back to normal |

When booting and the modem 100 becomes bricked, the processor 106 can cause the light indicators 108 to illuminate based on the Scenario signal.

By viewing the light indicator 108 illumination sequence/scheme, a user can determine whether the corruption occurred in the NOR flash memory, the NAND flash memory, and/or the NVRAM memory, determine which boot up stage the modem 100 was in when it became bricked, determine whether the modem 100 became bricked when the FSBL was executing the first boot program or when the a SSBL was executing the second boot program, etc. For example, if a user views the light indicator panel and identifies a light indicator 108 illumination sequence of pulses, each for 100 ms, and then stops emitting for two seconds, and then repeats this scheme.

TABLE 2

Exemplary 1-Light Indicator Illumination Sequence/Scheme

| Color of Light Indicator | Number of Pulses of the Light | | | |
|---|---|---|---|---|
| | 1 | 2 | 3 | 4 |
| Red Color | Scenario 1 | Scenario 2 | Scenario 3 | Scenario 4 |
| Blue Color | Scenario 5 | Scenario 6 | Scenario 7 | N/A |

Once a user determines whether the modem 100 experienced a failure during boot up and which stage the failure occurred by identifying the Scenario illumination schemes, a user can then begin a technique to either confirm that such a failure occurred or to correct for the failure.

If a user determines that the failure occurred due to a NOR flash memory corruption, a user can remove the NOR flash memory from the modem 100 and install it in a different modem 100 to determine if the image on the NOR is valid (i.e., determine if the different modem will boot). If the NOR image is invalid (e.g., the different modem will not boot), then the failure did occur due to a corruption to the NOR flash memory. If so, a user can proceed by examining the NOR flash memory contents. If the NOR image is valid (e.g., the different modem will boot), then this can be an indicator that the failure occurred in the NAND flash memory.

If a user determines that the failure occurred due to a NAND flash memory corruption, a user can start with the NOR flash memory swap discussed above. If the NOR image is valid (indicating that the failure occurred in the NAND flash memory), a user can then remove the NAND flash memory from the modem 100 and insert it into a different modem 100 to determine if the ATOM and the ARM boot sequences successfully boot.

Figure 4:
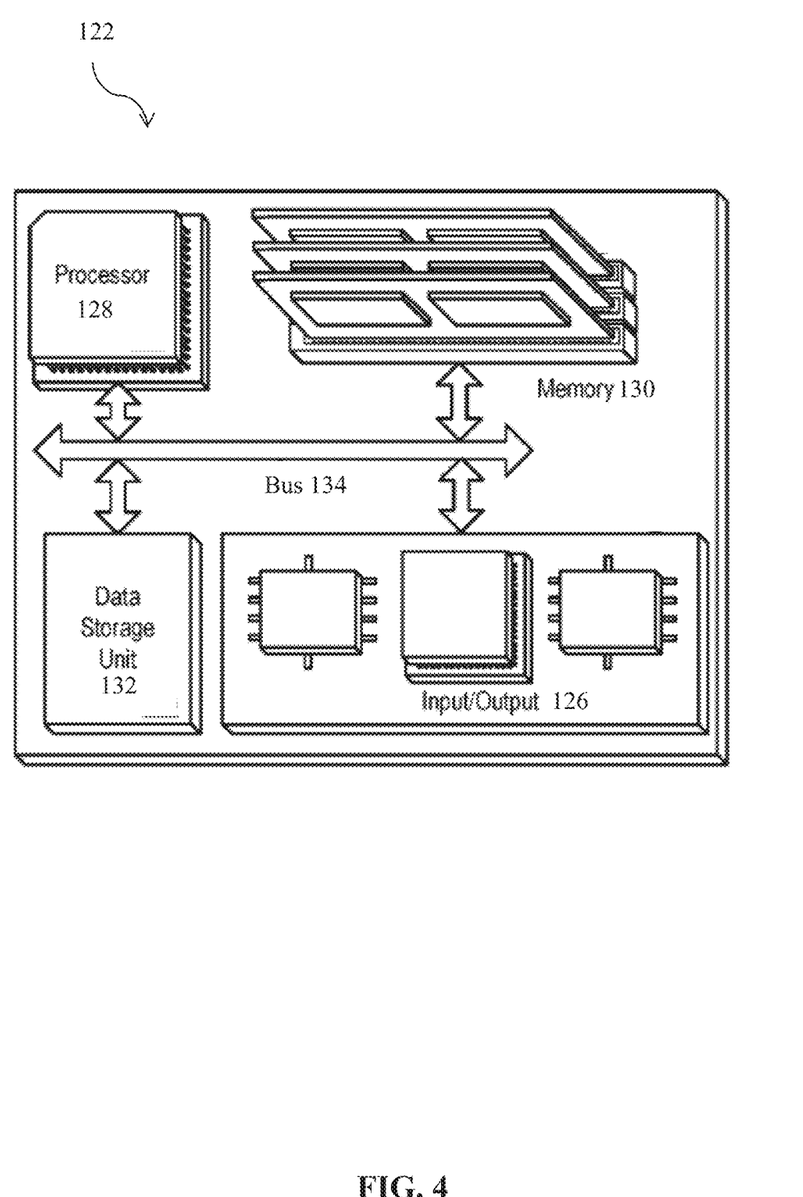
FIG. 4 shows an exemplary hardware architecture for an embodiment of a communication device.

Referring to FIG. 4, embodiments of the modem 100 disclosed can function as a gateway so as to provide a network node equipped to interface a first communication device 122 operating on a first communication protocol with a second communication device 122 operating on a second communication protocol. FIG. 4 shows an exemplary architecture for any one or combination of the first communication device 122 and second communication device 122. The first and/or second communication device 122 can be a computer, a broadband device, a multimedia device, etc. The communication device 122 can include an input/output device 126 configured to provide input/output operations for the communication device 122. In some embodiments, the input/output device 126 can include driver devices configured to receive input data and send output data to the modem 100, as well as send communications to, and receive communications from, various networks.

The communication device 122 can include a processor 128, a memory 130, a storage device 132, and the input/output device 126. Each of the components 128, 130, 132, and 126 can, for example, be interconnected using a system bus 134. The processor 128 is capable of processing instructions for execution within the communication device 122. The processor 128 can be a single-threaded processor or a multi-threaded processor. The processor 128 is capable of processing instructions stored in the memory 130 or on the storage device 132. The memory 130 stores information within the communication device 122. The memory 130 can be a computer-readable medium, a volatile memory unit, a non-volatile memory unit, etc. The storage device 132 is capable of providing mass storage for the communication device 122. The storage device 132 can be a computer-readable medium, a hard disk device, an optical disk device, flash memory, or some other large capacity storage device.

The communication device 122, and components thereof, can be realized by instructions that upon execution cause one or more processing devices to carry out the processes and functions embedded in software stored within the memory 130 or storage device 132. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, e.g., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "processor" encompasses all apparatus, devices, and machines for processing data, including by way of example a programmable processor, a computer, or multiple processors or computers. The processor can include, in addition to hardware, code that creates an execution environment for the computer program in question (e.g., code that constitutes processor firmware, a protocol stack, a database management system, an operating system, or a combination of one or more of them).

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer (or processor) or on multiple computers (or multiple processors) that are located at one site or distributed across multiple sites and interconnected by a communication network 124.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors (general microprocessor being transformed into special purpose microprocessor through the application of algorithms described herein), and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer can be embedded in another device (e.g., a mobile communications device, a phone, a cable modem, a set-top box, a mobile audio or video player, or a game console, to name just a few).

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube) or LCD (liquid crystal display) monitor, for displaying information to the user and a keyboard and a pointing device (e.g., a mouse or a trackball, by which the user can provide input to the computer). Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

While this specification contains many specific implementation details, these should not be construed as limitations on the scope of any invention or of what can be claimed, but rather as descriptions of features that can be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing can be advantageous.

What is claimed is:

1. A modem, comprising:
   a processor including a Unified Extensible Firmware Interface (UEFI) driver, the UEFI driver configured to provide a software interface between an operating system for the modem and firmware for the modem; and
   a boot diagnostic driver configured to run from the UEFI driver and execute a diagnostic test on firmware when the modem is booting up, the firmware causing the modem to become bricked, wherein the diagnostic test includes a plurality of tests including:
      a first diagnostic test configured to determine whether an ATOM boot sequence was successfully booted, and
      a second diagnostic test configured to determine whether an ARM boot sequence was successfully booted;
   wherein the boot diagnostic driver is configured to generate a signal based on a result of the plurality of diagnostic tests.

2. The modem of claim 1, further comprising a light indicator, wherein:
   the boot diagnostic driver is configured to transmit the signal to the processor and the processor is configured to generate a light illumination sequence command that is representative of the signal, the light illumination sequence command being configured to cause the light indicator to illuminate.

3. The modem of claim 1, wherein the plurality of diagnostic tests includes any or a combination of:
   a third diagnostic test configured to determine whether a first secure boot loader successfully executed a first boot program;
   a fourth diagnostic test configured to determine whether a hardware check failure occurred;
   a fifth diagnostic test configured to determine whether an integrity validation failure occurred when the first secure boot loader attempted to execute the first boot program;
   a sixth diagnostic test configured to determine whether a second secure boot loader successfully executed a second boot program; and
   a seventh diagnostic test configured to determine whether an integrity validation failure occurred when the second secure boot loader attempted to execute the second boot program.

4. The modem of claim 3, wherein the boot diagnostic driver is configured such that the plurality of diagnostic tests includes all of the first, second, third, fourth, fifth, sixth, and seventh diagnostic tests.

5. The modem of claim 4, wherein the boot diagnostic driver is configured such that the plurality of diagnostic tests is implemented in sequential order.

6. The modem of claim 5, wherein the boot diagnostic driver is configured such that:
when the ATOM boot sequence is successfully booted the boot diagnostic driver proceeds to the second diagnostic test, but when the ATOM boot sequence is not successfully booted the boot diagnostic driver generates a first signal;
when the ARM boot sequence is successfully booted the boot diagnostic driver proceeds to the third diagnostic test, but when the ARM boot sequence is not successfully booted the boot diagnostic driver generates a second signal;
when the first secure boot loader successfully executes the first boot program the boot diagnostic driver proceeds to the fourth diagnostic test, but when the first secure boot loader does not successfully execute the first boot program the boot diagnostic driver generates a third signal;
when the hardware check failure does not occur the boot diagnostic driver proceeds to the fifth third diagnostic test, but when the hardware check failure does occur the boot diagnostic driver generates a fourth signal;
when the integrity validation failure does not occur when the first secure boot loader attempted to execute the first boot program the boot diagnostic driver proceeds to the sixth diagnostic test, but when the integrity validation failure does occur when the first secure boot loader attempted to execute the first boot program the boot diagnostic driver generates a fifth signal;
when the second secure boot loader successfully executes the second boot program the boot diagnostic driver proceeds to the seventh diagnostic test, but when the second secure boot loader does not successfully execute the second boot program the boot diagnostic driver generates a sixth signal; and
when the integrity validation failure does not occur when the second secure boot loader attempted to execute the second boot program the boot diagnostic driver-concludes the diagnostic test sequence, but when the integrity validation failure does occur when the second secure boot loader attempted to execute the second boot program the boot diagnostic driver generates a seventh signal.

7. The modem of claim 6, wherein the processor is configured such that it generates:
a first light illumination sequence command based on the first signal;
a second light illumination sequence command based on the second signal;
a third light illumination sequence command based on the third signal;
a fourth light illumination sequence command based on the fourth signal;
a fifth light illumination sequence command based on the fifth signal;
a sixth light illumination sequence command based on the sixth signal; and
a seventh light illumination sequence command based on the seventh signal.

8. The modem of claim 2, wherein the processor is configured such that it generates the light illumination sequence command and causes the light indicator to illuminate even when the modem experiences a failure.

9. The modem of claim 8, wherein the failure is at least due to an upgraded firmware that has been downloaded and/or attempted to be downloaded.

10. A communication system, comprising:
a first communication device in connection with a first modem; and
a second communication device in connection with a second modem;
wherein the first modem comprises:
a first processor including a first Unified Extensible Firmware Interface (UEFI) driver, the first UEFI driver configured to provide a software interface between an operating system for the first modem and firmware for the first modem; and
a first boot diagnostic driver configured to run from the first UEFI driver and execute a diagnostic test on firmware when the modem is booting up, the firmware causing the modem to become bricked, wherein the diagnostic test includes a plurality of tests including:
a first diagnostic test configured to determine whether an ATOM boot sequence was successfully booted, and
a second diagnostic test configured to determine whether an ARM boot sequence was successfully booted;
wherein the first boot diagnostic driver is configured to generate a signal based on a result of the plurality of diagnostic tests.

11. The communication system of claim 10, wherein the second modem comprises:
a second processor including a second UEFI driver, the second UEFI driver configured to provide a software interface between an operating system for the second modem and firmware for the second modem; and
a second boot diagnostic driver configured to run from the second UEFI driver and execute a diagnostic test when the second modem is booting up;
wherein the second boot diagnostic driver is configured to generate a signal based on a result of the diagnostic test.

12. A method for diagnosing a modem failure, the method comprising:
performing a diagnostic test of a software interface between an operating system for the modem and firmware for the modem while the modem is booting up, the firmware causing the modem to become bricked, wherein the diagnostic test includes a plurality of tests including:
a first diagnostic test configured to determine whether an ATOM boot sequence was successfully booted, and
a second diagnostic test configured to determine whether an ARM boot sequence was successfully booted; and
generating a signal based on a result of the plurality of diagnostic tests.

13. The method of claim 12, further comprising:
generating a light illumination sequence command based on the signal.

14. The method of claim 12, wherein the plurality of diagnostic tests includes any or a combination of:
a third diagnostic test configured to determine whether a first secure boot loader successfully executed a first boot program;
a fourth diagnostic test configured to determine whether a hardware check failure occurred;
a fifth diagnostic test configured to determine whether an integrity validation failure occurred when the first secure boot loader attempted to execute the first boot program;

a sixth diagnostic test configured to determine whether a second secure boot loader successfully executed a second boot program; and a seventh diagnostic test configured to determine whether an integrity validation failure occurred when the second secure boot loader attempted to execute the second boot program.

15. The method of claim 14, wherein the plurality of diagnostic tests includes all of the first, second, third, fourth, fifth, sixth, and seventh diagnostic tests.

16. The method of claim 14, wherein the plurality of diagnostic tests is implemented in sequential order.

17. The method of claim 13, wherein the light illumination sequence command is generated even when the modem experiences a failure.

18. The method of claim 17, wherein the failure is at least due to an upgraded firmware that has been downloaded and/or attempted to be downloaded.

19. The method of claim 3,
wherein the first secure boot loader and/or the second secure boot loader are configured to generate a manifest verified OK log; and
wherein the boot diagnostic driver is further configured to compare the generates manifest verified OK log of the first secure boot loader and/or the second secure boot loader to a standard log of the first secure boot loader and/or the second secure boot loader to determine whether the modem fails one or more of the plurality of diagnostic tests.

20. A modem, comprising:
a processor including a Unified Extensible Firmware Interface (UEFI) driver, the UEFI driver configured to provide a software interface between an operating system for the modem and firmware for the modem;
a boot diagnostic driver configured to run from the UEFI driver and execute a plurality of diagnostic tests when the modem is booting up, wherein the plurality of diagnostic tests includes:
  a first diagnostic test configured to determine whether a first secure boot loader successfully executed a first boot program,
  a second diagnostic test configured to determine whether a hardware check failure occurred,
  a third diagnostic test configured to determine whether an integrity validation failure occurred when the first secure boot loader attempted to execute the first boot program;
  a fourth diagnostic test configured to determine whether a second secure boot loader successfully executed a second boot program,
  a fifth diagnostic test configured to determine whether an integrity validation failure occurred when the second secure boot loader attempted to execute the second boot program,
  a sixth diagnostic test configured to determine whether an ATOM boot sequence was successfully booted, and
  a seventh diagnostic test configured to determine whether an ARM boot sequence was successfully booted; and
a light indicator;
wherein the boot diagnostic driver is configured to:
  generate a signal based on a result of the diagnostic test, and
  transmit the signal to the processor;
the processor further configured to generate a light illumination sequence command that is representative of the signal, the light illumination sequence command being configured to cause the light indicator to illuminate.

* * * * *